(12) United States Patent
Bennett

(10) Patent No.: US 11,111,007 B2
(45) Date of Patent: Sep. 7, 2021

(54) LANDING GEAR ASSEMBLY

(71) Applicant: Safran Landing Systems UK Limited, Gloucester (GB)

(72) Inventor: Ian Bennett, Gloucester (GB)

(73) Assignee: Safran Landing Systems UK Limited

(*) Notice: Subject to any disclaimer, the term of this patent is extended or adjusted under 35 U.S.C. 154(b) by 210 days.

(21) Appl. No.: 16/424,723

(22) Filed: May 29, 2019

(65) Prior Publication Data

US 2019/0367161 A1    Dec. 5, 2019

(30) Foreign Application Priority Data

May 30, 2018    (EP) .................................... 18175143

(51) Int. Cl.
*B64C 25/34* (2006.01)
*B64C 25/00* (2006.01)

(52) U.S. Cl.
CPC ............ *B64C 25/001* (2013.01); *B64C 25/34* (2013.01)

(58) Field of Classification Search
CPC ........ B64C 25/001; B64C 25/16; B64C 25/34
See application file for complete search history.

(56) References Cited

U.S. PATENT DOCUMENTS

| | | | | | |
|---|---|---|---|---|---|
| 3,010,682 | A | * | 11/1961 | Moss | B64C 25/66 244/108 |
| 4,681,285 | A | * | 7/1987 | Bowdy | B64C 25/32 244/103 R |
| 2006/0102775 | A1 | * | 5/2006 | Chow | B64C 25/16 244/1 N |
| 2008/0142634 | A1 | * | 6/2008 | Moe | B64C 25/34 244/1 N |
| 2012/0292442 | A1 | * | 11/2012 | Simonneaux | B64C 25/001 244/100 R |

FOREIGN PATENT DOCUMENTS

| | | |
|---|---|---|
| EP | 1067045 A1 | 1/2001 |
| GB | 2475919 A | 6/2011 |
| WO | 2005096721 A2 | 10/2005 |

OTHER PUBLICATIONS

Extended European Search Report for European Application No. 18 175 143.9, dated Sep. 21, 2018—7 pages.

* cited by examiner

*Primary Examiner* — Philip J Bonzell
*Assistant Examiner* — Tye William Abell
(74) *Attorney, Agent, or Firm* — RatnerPrestia

(57) ABSTRACT

An aircraft landing gear assembly having a bogie beam, first and second wheel assemblies mounted on the bogie beam on longitudinally opposite sides of the bogie beam with respect to a bogie mounting bearing, a jacking dome mounted on the bogie beam to face a ground plane, and a guard that is distinct from the jacking dome and removably coupled to the bogie beam on an opposite side of the jacking dome with respect to the bogie mounting bearing. The jacking dome projects towards the ground plane by a first distance, and the guard extends from the bogie beam towards the ground plane by a second distance which is at least 0.9 times the first distance.

18 Claims, 2 Drawing Sheets

LANDING GEAR ASSEMBLY

This application claims the benefit of and priority to European Application EP 18175143.9, filed on May 30, 2018, which is incorporated herein by reference.

BACKGROUND

Larger commercial and military aircraft typically have main landing gear arrangements that include a bogie beam carrying multiple wheel axles and wheels, the bogie beam typically being pivotally attached to one end of a telescopic strut.

From time to time it is necessary to jack up the bogie beam whilst the aircraft is on the ground, typically to allow individual wheels to be replaced, for example in the case of the aircraft having suffered a blow-out during landing.

The current technical standards stipulate that the bogie beam includes one or more jacking domes that are of a particular shape to engage with a correspondingly shaped jacking pad on the jacking trolley used to jack up the landing gear. Jacking domes are typically provided at either end of the bogie beam, below the axles.

A jacking dome can be formed separately from the bogie beam and coupled to the bottom surface of the bogie beam by way of a threaded coupling. While such a jacking dome can be removed from the bogie beam if damaged, the coupling region can increase the weight of the landing gear, provide a region of weakness and can also be susceptible to corrosion.

A jacking dome can alternatively be formed integrally with a bogie beam. This can address the weight, strength and corrosion issues highlighted above. However, if an integrally formed jacking dome is damaged, for example during an aircraft jacking procedure, it can be time consuming and disruptive to repair the dome by way of a machining operation. If the level of damage is severe, the bogie beam may need to be replaced.

The present inventor has devised a new type of landing gear assembly that can address one or more of the problems identified above.

SUMMARY

According to a first aspect of the present invention there is provided an aircraft landing gear assembly comprising:
  a bogie beam including a bogie mounting bearing via which the bogie beam is arranged to be pivotally coupled to an aircraft landing gear main strut so as to pivot about a bogie pivot axis;
  first and second wheel assemblies mounted on the bogie beam on longitudinally opposite end portions of the bogie beam with respect to the bogie mounting bearing, the first and second wheel assemblies being rotatable around respective first and second wheel axes, the first and second wheel axes defining an axle plane;
  a jacking dome mounted on the bogie beam to face a ground plane which is tangential to a wheel of the first wheel assembly and tangential to a wheel of the second wheel assembly, the jacking dome projecting towards the ground plane by a first distance, defined from the axle plane to the point on the jacking dome closest to the ground plane; and
  a guard distinct from the jacking dome and being configured to be removably coupled to the bogie beam on an opposite side of the jacking dome with respect to the bogie mounting bearing, the guard being sized to extend from the bogie beam towards the ground plane by a second distance which is at least 90% of the first distance, the second distance being defined from the axle plane to the point on the guard closest to the ground plane.

Thus, the guard extends from the bogie beam towards the ground plane by a length which can reduce the likelihood of a jack being advanced towards the jacking dome in an overly elevated jacking height which could cause the jack to strike the jacking dome while being advanced under it to a lifting position. In contrast to a jacking dome, the guard can be easily removed and replaced if damaged.

The second distance can be greater than or equal to the first distance. Thus, the guard can project to an extent that, if the jack can be advanced underneath the guard along the ground plane, the jack cannot not strike the jacking dome when being moved to the lifting position.

The second distance can be at least 1.1 times the first distance. This enables the guard to act as a physical barrier to the jack striking the jacking dome even if the ground plane has bumps or other surface imprecations that could vary the height of the jack relative to the bogie beam as it is advanced to the lifting position.

Preferably the second distance is less than or equal to 1.5 times the first distance, as anything above this is unlikely to improve protection due to the generally planar configuration of a runway, but will add weight to the landing gear assembly.

The jacking dome can be located closer to the wheel axis of the first wheel assembly than the wheel axis of the second wheel assembly. As such, in use, a jack would be advanced to a jacking position under the jacking dome by advancing the jack from a first end of the bogie beam towards the jacking dome between a pair of wheels of the first wheel assembly, mounted on laterally opposite side of the bogie beam.

The guard can be elongate.

The guard can be sized such that the gaps on either side of it between the guard and inner wheel planes of a pair of wheels are each less than or equal to 200 mm and in some cases less than or equal to 165 mm. Thus, the guard can be sized to inhibit a jack from moving beyond the guard without striking the guard unless the jack is in an elevation condition that is low enough to pass under the guard.

Alternatively, the guard can be sized such that the gaps on one or both side of it between the guard and inner wheel planes are each greater than or equal to 200 mm or in some cases greater than or equal to 254 mm. In such embodiments, the guard can act as a visual deterrent and/or datum marker that may reduce the likelihood of a jack being advanced in an elevation state that would result in the jack striking the jacking dome. The guard according to such embodiments can have a relatively thin flow-facing surface area when the landing gear is deployed for take-off and landing, which can reduce noise impact attributable to the guard and/or can improve an engineer's view of the jacking dome as the jack is advanced for jacking.

The landing gear assembly can further comprise a functional part comprising or coupled to the bogie beam by a mechanical fastener, wherein the guard is coupled to the bogie beam via the mechanical fastener. Thus, an existing fastener such as an end diaphragm or axle retaining bolt can be used to retain the guard, which can limit weight impact on the landing gear assembly.

The guard can comprise a mounting hole arranged to receive a fixed part of the fastener. This can provide a relatively simple, lightweight means of mounting the guard in comparison to the mounting means of a removable jacking dome. The fixed part of the fastener can be a threaded bolt.

The guard can be arranged to be mounted in a cantilevered manner.

The guard can comprise a plate portion. The plate can be orientated with a major face being parallel to the bogie pivot axis. This can result in a guard that can cover a majority of the jacking dome to guard a majority of the jacking dome.

The plate can alternatively be orientated with a minor, edge surface being parallel to the bogie pivot axis. This can result in a guard that can react relatively large force impacts from a jack in comparison to the major surface arrangement for the same plate size, shape and material, with reduced aerodynamic noise or resistance.

A single guard plate may be fixed at one end of a bogie beam, or guards may be used at both ends of the beam.

In a further aspect of the invention there is provided an aircraft landing gear assembly comprising: an axle, defining an wheel axis about which a wheel is rotatable, a jacking dome extending toward a ground plane a first vertical distance, between the wheel axis and the bottom point of the jacking dome, and a guard removably coupled to the assembly, extending toward the ground plane by a second distance which is at least 90% of the first distance, the second distance being defined between the wheel axis and the bottom point of the guard.

Optional features of the first aspect may be combined with the further aspect.

BRIEF DESCRIPTION OF THE DRAWINGS

Embodiments of the invention will now be described with reference to the accompanying drawings, in which.

DETAILED DESCRIPTION

Figure 1:
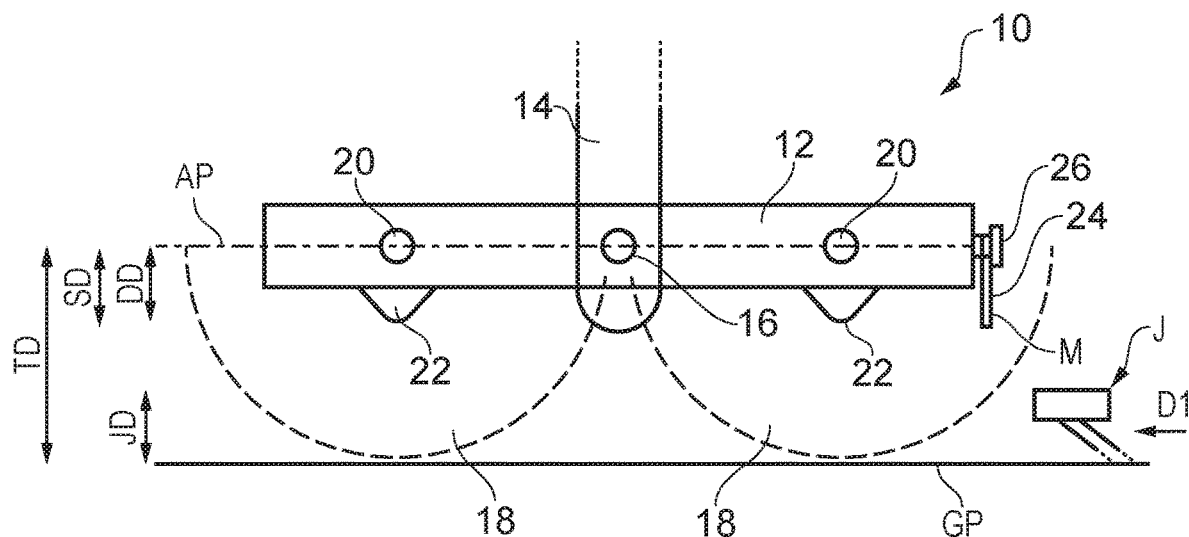
FIG. 1 is a side view diagram of an aircraft landing gear assembly according to an embodiment of the invention.

FIG. 1 is a diagram illustrating a side view of an aircraft landing gear assembly 10 according to an embodiment of the invention.

The aircraft landing gear assembly 10 comprises an elongate bogie beam 12 pivotally coupled to an aircraft landing gear main strut 14 via a bogie pivot bearing 16.

A pair of wheel assemblies 18 are mounted on the bogie beam via axles 20 or any other suitable means and arranged such that the bogie pivot bearing 16 lies between the wheel assemblies 18. Each wheel assembly 18 in this example has a pair of wheels, one on either side of the bogie beam 12.

With the aircraft landing gear 10 supporting the weight of an aircraft (not shown) on a ground plane GP such an aircraft runway or holding area, the ground plane GP is approximately tangential to the wheels of wheel assemblies 18, neglecting compression of the tyres.

An axle plane AP intersects the rotational axes of the wheels. The axle plane AP is parallel with respect to and offset from the ground plane GP by a total distance TD.

The bogie beam 12 is provided with jacking domes 22 which project from the underside of the bogie beam 12 towards the ground plane GP.

The jacking domes 22 can have any conventional shape and configuration. For example, the jacking domes 22 can be integrally formed as part of a metal alloy bogie beam 12. Alternatively, the jacking domes 22 can be removably coupled to the bogie beam 12. It is however preferred in embodiments of the invention that the jacking domes 22 are integrally formed with the bogie beam 12 because this can reduce the weight, increase the strength of and improve corrosion resistance of the aircraft landing gear assembly 10.

It can be necessary to jack the aircraft. This can be achieved by advancing a jack J under the bogie beam 12 from an end of the bogie beam 12 in the direction D1 until a lifting portion of the jack J is situated directly under the jacking dome 22. As illustrated, as the jack J is advanced into a lifting position, the height of the jack JD will determine whether the jack J can move under the jacking dome 22 without striking it. If the jack J strikes the jacking dome 22 then it can damage the jacking dome, which is particularly problematic in the case where a jacking dome 22 is integrally formed with the bogie beam 12. The jacking dome 22 projects downwardly from the bogie beam 12 toward the ground plane GP by a first distance DD. That is, the tip of the jacking dome 22 is offset from the axle plane AP by the first distance DD.

Embodiments of the present invention differ from known aircraft landing gear assemblies in that it includes a jacking dome guard 24. The guard 24 is removably coupled to the bogie beam 12 by a mechanical fastener 26 or the like. The guard 24 projects from the axle plane AP towards the ground plane GP by a second distance SD. The second distance SD is at least 0.9 times the first distance DD such that the guard 24 acts as a visual deterrent and in some cases defines a physical blocking structure to reduce the likelihood of, and in some cases inhibit, an overly elevated jack J striking the jacking dome 22 as it is advanced under the bogie beam 12.

The second distance SD can be equal to the first distance DD. In such embodiments, in order for the jack J to pass under the guard 24, the jack height JD must be such that it cannot strike the jacking dome 22 (assuming a level ground plane GP).

In some embodiments, the second distance SD can be at least 1.1 times the distance DD. This can reduce the likelihood of a jack J being able to pass under the guard 24 and yet strike the jacking dome 22 on uneven ground planes GP.

It is preferred that the second distance SD is no more than 1.5 times the first distance DD, as it has been found that beyond this provides little or no additional benefit in exchange for the additional weight and drag created.

As can be seen, the guard 24 is coupled to the bogie beam 12 at an end region of the bogie beam 12 such that the jacking dome 22 resides between the guard 24 and the bogie pivot 16.

Figure 2:
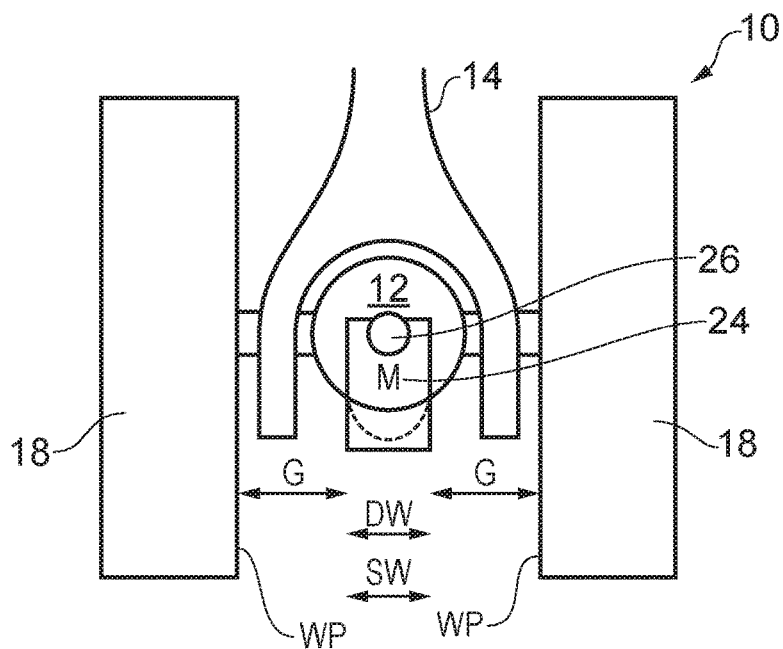
FIG. 2 is a front view diagram of the landing gear assembly of FIG. 1.

Referring additionally to FIG. 2, the guard 24 in the illustrated embodiment is formed as a plate having relatively large surface area major surfaces M (illustrated in FIG. 2) and relatively minor side surfaces m (illustrated in FIG. 1). The width of the guard SW is equal to the width of the jacking dome DW such that the guard masks the jacking dome 22 from an oncoming jack J and acts a physical blocking structure.

In other embodiments, the guard 24 can have a width SW which is less than or greater than the width of the jacking dome DW.

Additionally, in the illustrated embodiment the gaps G on either side of the guard 24 between the edges of the guard 24 and the inner wheel planes WP which extend orthogonal with respect to the axles 20 are sized such that a jack cannot pass through them. Thus, the guard 24 in the illustrated embodiment inhibits an overly elevated jack J from striking the jacking dome 22.

An inner wheel plane is a vertical plane, normal to the wheel axle, aligned with an innermost part of a wheel. It is noted that the inner side of a wheel might not be entirely planar, due to bulging of the tyre at the point of contact with the ground. In this case, the inner wheel plane is in line with the innermost point of the bulge.

Figure 3:
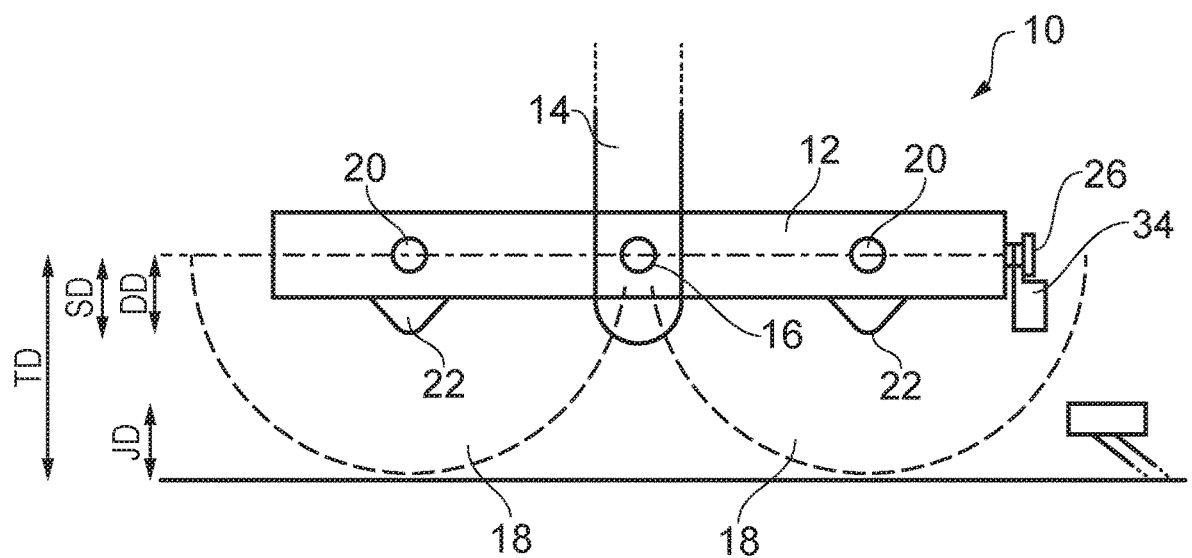
FIG. 3 is a side view diagram of a landing gear assembly according to a further embodiment of the invention.
Figure 4:
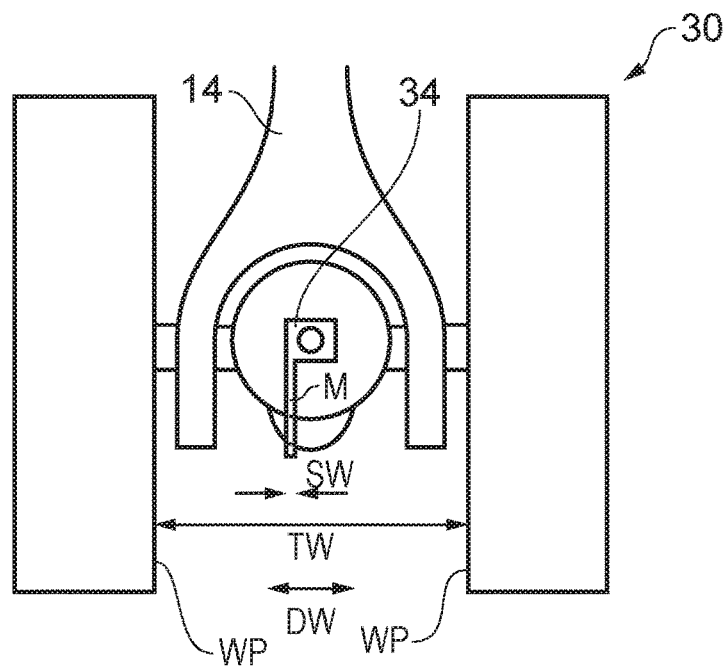
FIG. 4 is a front view diagram of the landing gear assembly of FIG. 3.

Referring now to FIGS. 3 and 4, front and side views of a landing gear assembly 30 according to a further embodiment of the invention are shown. The landing gear assembly 30 differs from the landing gear assembly 10 in that the guard 34 is orientated at 90 degrees with respect to the guard 24 such that a minor face m faces outwardly from the end of the bogie beam. Thus, the major faces M are generally orthogonal with respect to the longitudinal axis of each axle A.

In this embodiment, the width of the guard SW is much smaller than the width of the jacking dome DW. As such, one or both gaps may allow passage of an overly elevated jack J through them such that it could strike the jacking dome 22.

However, in such embodiments the guard 34 presents an obstacle to an overly elevated jack J approaching in certain approach patterns and also provides a visual deterrent that may reduce the likelihood of an engineer inadvertently advancing an overly elevated jack J.

The embodiment shown in FIGS. 3 and 4 has advantages over the embodiment shown in FIGS. 1 and 2 in that the planar guard 34, if struck by an overly elevated jack J, reacts the impact edge on and is therefore less likely to bend or break in comparison to the planar guard 24 of FIG. 2. Also, an edge facing guard may create less drag and aeroacoustic noise in comparison to the guard 24, and also enables an engineer to see easily beyond it when performing a jacking operation.

A guard according to embodiments of the invention is removably coupled to the bogie beam 12. As such, if an overly elevated jack J strikes and damages the guard then the guard will be easily removed and replaced. This is particularly advantageous where the jacking domes are integrally formed with the bogie beam because repair operations on integrally formed jacking domes can be very time-consuming and complex.

A guard according to embodiments of the invention can take any suitable form which can create a visual deterrent and in some cases inhibit an overly elevated jack from striking a jacking dome of the landing gear assembly. For example, the guard may be in the form of a bar, or an aerodynamically complex moulded shape.

A guard according to embodiments of the invention can be formed of any suitable aerospace material such as a non-metallic composite, steel, aluminium, titanium, or an alloy thereof.

While the illustrated embodiments show a single guard being provided on the landing gear assembly, it will be appreciated that both ends of the bogie beam can be provided with respective guards.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear assembly comprising:
    a bogie beam including a bogie mounting bearing via which the bogie beam is arranged to be pivotally coupled to an aircraft landing gear main strut so as to pivot about a bogie pivot axis;
    first and second wheel assemblies mounted on the bogie beam on longitudinally opposite sides of the bogie beam with respect to the bogie mounting bearing, the first and second wheel assemblies being rotatable around respective first and second wheel axes, the first and second wheel axes defining an axle plane;
    a jacking dome mounted on the bogie beam to face a ground plane which is tangential to a wheel of the first wheel assembly and tangential to a wheel of the second wheel assembly when the first wheel assembly and the second wheel assembly are contacting a ground surface, the jacking dome projecting towards the ground plane by a first distance, defined from the axle plane to a point on the jacking dome closest to the ground plane; and
    a guard distinct from the jacking dome and configured to be removably coupled to the bogie beam on an opposite side of the jacking dome with respect to the bogie mounting bearing, the guard being sized to extend from the bogie beam towards the ground plane by a second distance which is at least 0.9 times the first distance, the second distance being defined from the axle plane to a point on the guard closest to the ground plane, wherein the guard is removably coupled to the bogie beam at a mounting position located on an opposite side of the jacking dome with respect to the bogie mounting bearing.

2. The aircraft landing gear assembly according to claim 1, wherein the guard is sized to extend from the bogie beam towards the ground plane by the second distance which is at least 0.9 times the first distance, the second distance being defined from the axle plane to the point on the guard closest to the ground plane, such that the guard extends from the bogie beam towards the ground plane by a length which can reduce the likelihood of a jack being advanced towards the jacking dome in an overly elevated jacking height which could cause the jack to strike the jacking dome while being advanced under it to a lifting position.

3. The aircraft landing gear assembly according to claim 1, wherein the jacking dome is located closer to the wheel axis of the first wheel assembly than the wheel axis of the second wheel assembly.

4. The aircraft landing gear assembly according to claim 1, wherein the guard is sized in a lateral direction to be spaced from an inner wheel plane of an adjacent wheel by a distance of less than or equal to 200 mm.

5. The aircraft landing gear assembly according to claim 1, wherein the guard is sized in a lateral direction to be spaced from an inner wheel plane of an adjacent wheel by a distance greater than or equal to 200 mm.

6. The aircraft landing gear assembly according to claim 1, wherein the guard comprises a mounting hole arranged to receive a part of a fastener.

7. The aircraft landing gear assembly of claim 1, wherein the guard is fixed against movement relative to the bogie beam when coupled to the bogie beam.

8. The aircraft landing gear assembly according to claim 1, wherein the guard is mounted in a cantilevered manner.

9. The aircraft landing gear assembly according to claim 1, wherein the guard comprises a plate.

10. The aircraft landing gear assembly according to claim 9, wherein the plate is orientated with a major face being parallel to the bogie pivot axis.

11. The aircraft landing gear assembly according to claim 9, wherein the plate is orientated with a minor, edge surface being parallel to the bogie pivot axis.

12. The aircraft landing gear assembly according to claim 1, wherein the second distance is greater than or equal to the first distance.

13. The aircraft landing gear assembly according to claim 12, wherein the second distance is at least 1.1 times the first distance.

14. The aircraft landing gear assembly according to claim 13, wherein the second distance is less than or equal to 1.5 times the first distance.

15. An aircraft including one or more aircraft landing gear assemblies, each aircraft landing gear assembly comprising:
a bogie beam including a bogie mounting bearing via which the bogie beam is arranged to be pivotally coupled to an aircraft landing gear main strut so as to pivot about a bogie pivot axis;
first and second wheel assemblies mounted on the bogie beam on longitudinally opposite sides of the bogie beam with respect to the bogie mounting bearing, the first and second wheel assemblies being rotatable around respective first and second wheel axes, the first and second wheel axes defining an axle plane;
a jacking dome mounted on the bogie beam to face a ground plane which is tangential to a wheel of the first wheel assembly and tangential to a wheel of the second wheel assembly when the first wheel assembly and the second wheel assembly are contacting a ground surface, the jacking dome projecting towards the ground plane by a first distance, defined from the axle plane to the point on the jacking dome closest to the ground plane; and
a guard distinct from the jacking dome and being configured to be removably coupled to the bogie beam on an opposite side of the jacking dome with respect to the bogie mounting bearing, the guard being sized to extend from the bogie beam towards the ground plane by a second distance which is at least 0.9 times the first distance, the second distance being defined from the axle plane to the point on the guard closest to the ground plane, wherein the guard is removably coupled to the bogie beam at a mounting position located on an opposite side of the jacking dome with respect to the bogie mounting bearing.

16. The aircraft of claim 15, wherein the guard is fixed against movement relative to the bogie beam when coupled to the bogie beam.

17. A method of servicing an aircraft landing gear assembly,
the aircraft landing gear assembly comprising:
a bogie beam including a bogie mounting bearing via which the bogie beam is arranged to be pivotally coupled to an aircraft landing gear main strut so as to pivot about a bogie pivot axis;
first and second wheel assemblies mounted on the bogie beam on longitudinally opposite sides of the bogie beam with respect to the bogie mounting bearing, the first and second wheel assemblies being rotatable around respective first and second wheel axes, the first and second wheel axes defining an axle plane;
a jacking dome mounted on the bogie beam to face a ground plane which is tangential to a wheel of the first wheel assembly and tangential to a wheel of the second wheel assembly when the first wheel assembly and the second wheel assembly are contacting a ground surface, the jacking dome projecting towards the ground plane by a first distance, defined from the axle plane to the point on the jacking dome closest to the ground plane; and
a guard distinct from the jacking dome and being configured to be removably coupled to the bogie beam on an opposite side of the jacking dome with respect to the bogie mounting bearing, the guard being sized to extend from the bogie beam towards the ground plane by a second distance which is at least 0.9 times the first distance, the second distance being defined from the axle plane to the point on the guard closest to the ground plane,
the method comprising:
removing the guard from the bogie beam; and
coupling a second guard to the bogie beam in the same position and orientation as the first guard was coupled to the bogie beam, wherein the guard is removably coupled to the bogie beam at a mounting position located on an opposite side of the jacking dome with respect to the bogie mounting bearing.

18. The method of claim 17, wherein the guard is fixed against movement relative to the bogie beam when coupled to the bogie beam, and wherein coupling the second guard to the bogie beam comprises fixing the second guard against movement relative to the bogie beam.

* * * * *